United States Patent
Engdahl

[11] Patent Number: 5,984,265
[45] Date of Patent: Nov. 16, 1999

[54] HOSE COUPLING

[76] Inventor: Björn Engdahl, Krokslätts Parkgata 58C, S- 431 68 Mölndal, Sweden

[21] Appl. No.: 08/983,196

[22] PCT Filed: Jun. 28, 1996

[86] PCT No.: PCT/SE96/00860

§ 371 Date: Jan. 13, 1998

§ 102(e) Date: Jan. 13, 1998

[87] PCT Pub. No.: WO97/04267

PCT Pub. Date: Feb. 6, 1997

[30] Foreign Application Priority Data

Jul. 14, 1995 [SE] Sweden ................................. 9502597

[51] Int. Cl.[6] ..................................................... F16L 37/28
[52] U.S. Cl. ........................ 251/148; 251/149.6; 285/315
[58] Field of Search ................................ 251/148, 149.1, 251/149.6; 285/315, 320, 313, 316

[56] References Cited

U.S. PATENT DOCUMENTS 4,681,350  7/1987  Gaita ................................. 285/316 X
5,290,009  3/1994  Heilmann ............................. 251/149.6
5,547,166  8/1996  Engdahl .............................. 251/149.6

FOREIGN PATENT DOCUMENTS 470452  4/1994  Sweden ........................... F16L 37/42

*Primary Examiner*—Kevin Lee
*Attorney, Agent, or Firm*—D. Peter Hochberg; William H. Holt

[57] ABSTRACT

A hose coupling incorporates a male part and a female part that is provided with a mechanism, which in cooperation with a slide axially displaceable on the female part renders possible pressure relief at disconnection. One of the mechanisms in the coupling is an angular locking body including a portion that is insertable in an axial groove in the female part, and has a length, such that the angular locking body is always at least substantially surrounded by a sleeve. The other inwardly directed part of the locking body has a length, such that the part extends into the groove of the male part when the locking body is influenced by the sleeve.

2 Claims, 2 Drawing Sheets

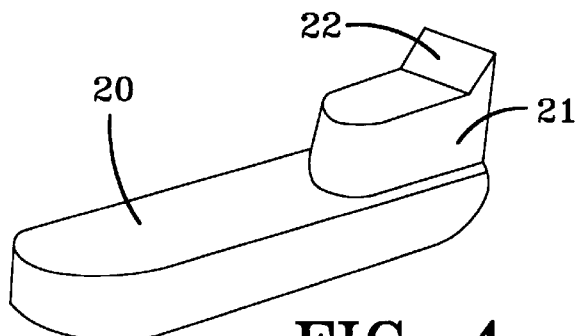
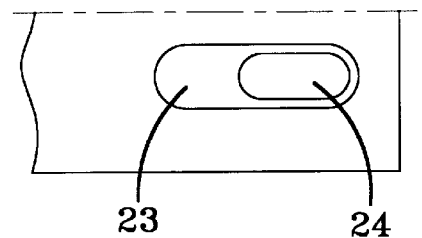
FIG-4   FIG-5
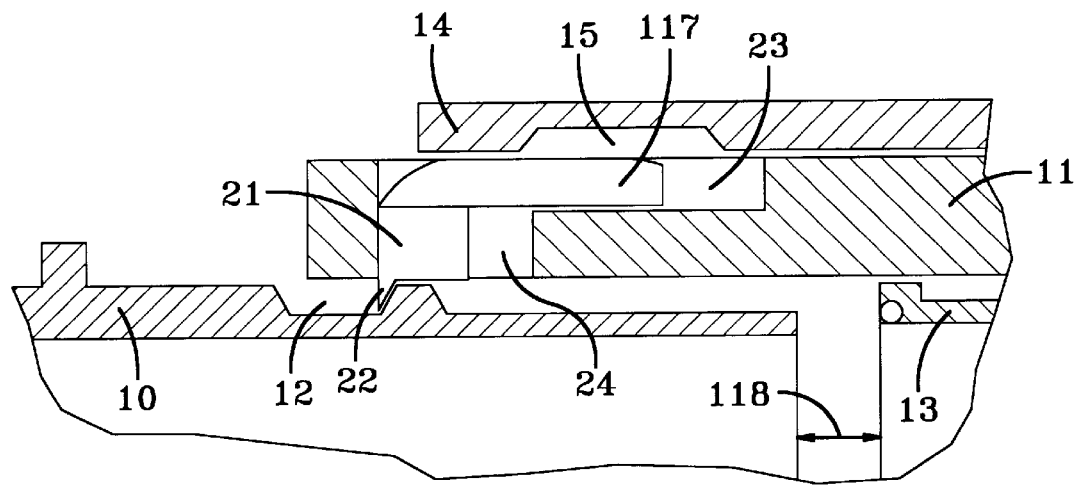
FIG-6
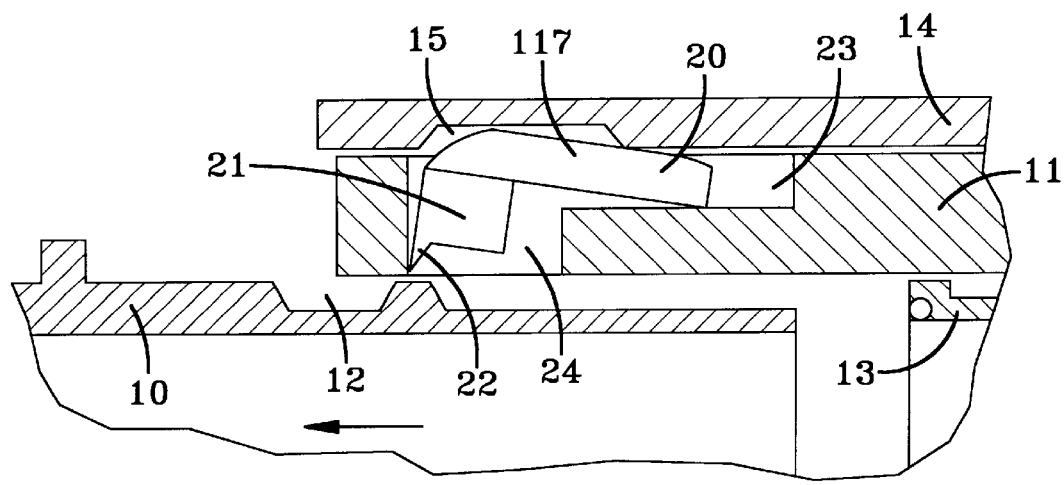
FIG-7

continues

HOSE COUPLING

BACKGROUND OF THE INVENTION

Field of the Invention

This invention relates to hose couplings and, in particular, to hose couplings having a male part, a female part, and an angular locking body insertable into the female part and being extendable into the male part when influenced by a sleeve.

A hose coupling usually has a male part and a female part, which is equipped with a non-return valve, which is opened by insertion of the male part. The male part is provided with a circumferential groove, which interacts with at least one locking body in the female part. The locking body traditionally is a round ball, which is surrounded by a sleeve which is axially displaceable on the female part.

Swedish patent 470 452 describes a hose coupling wherein the locking is completed with at least one balanced locking pawl, which is also surrounded by the sleeve and primarily retains the introduced male part. At disconnection the locking pawl is first released, and the ball grips after a short displacement in the male part. This makes it possible to blow of the fluid pressure present in the hose between the coupling and a connected tool without disturbing noises.

The locking body groove in different makes has a somewhat varying position in relation to the opening of the male part nipple, and in some embodiments it is difficult to retain the balls in the coupling. High pressures make it important to increase the material thickness, which means that the diameter of the ball must be increased. This causes the ball to have a poor grip in the groove.

SUMMARY OF THE INVENTION

The present invention refers to hose couplings of the type described in the introduction and provided with means for pressure relief at disconnection and it is characterized therein that the locking body is angular, with one portion, which is insertable in an axial groove in the female part, and has such a length that always at least has nay part thereof surrounded by the sleeve, and another, inwardly directed portion, which has such a length that it extends into the groove in the male part when the locking body is influenced by the sleeve.

BRIEF DESCRIPTION OF THE DRAWINGS

The invention will be described hereinafter with reference to the enclosed figures, wherein FIG. 4 shows a perspective view of a locking body according to the invention, FIG. 5 shows a part of the female part with a groove for the locking body, and FIGS. 6 & 7 show the encircled area in FIG. 1, with an angular locking body according to the invention in different coupling positions.

DETAILED DESCRIPTION OF THE PREFERRED EMBODIMENTS

Figure 1:
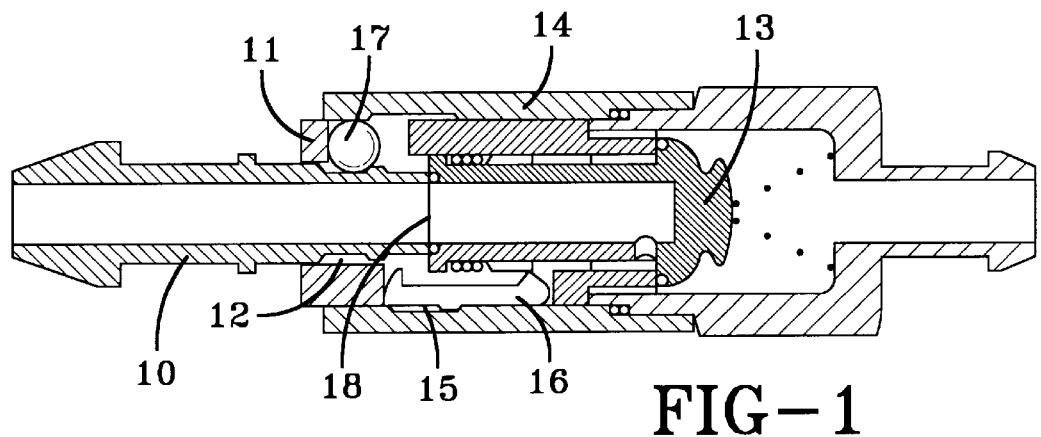
FIG. 1 shows a known embodiment of a hose coupling.

FIG. 1 shows a hose coupling according to the embodiment known from the patent 470 452. It has a male part 10 and a female part 11. The nipple of the male part, which is insertable into the female part, is provided with a circumferential groove 12. The female part is provided with a slide-shaped, spring-loaded non-return valve 13 and is surrounded by a likewise spring-loaded sleeve 14.

This is provided with an internal, circumferential groove 15. The sleeve 14 guides on one hand at least one balanced locking pawl 16, and on the other hand at least one locking body 17 in form of a round ball. When the male part is completely enclosed in the female part, the sleeve 14 urges the locking pawl 16 to engagement in the groove 12 of the male part, thus that the male part is securely retained. In the position shown in FIG. 1 the sleeve 14 has been retracted thus much that the locking pawl has released its grip in the male part groove. The male part then can be pulled outwards somewhat thus that there is a play 18 between the male part and its non-return valve, which is pushed forward by its spring. In this position the slide 14 keeps the ball 17 pressed down into the groove 12 thus that the male part is withheld during the time the over pressure in the hose part connected to the male part can blow out through the play 18. When the slide 14 by its spring is pushed forward the groove 15 will come just in front of the ball, which can then be brought out of the groove at continued pulling out of the male part.

Figure 2:
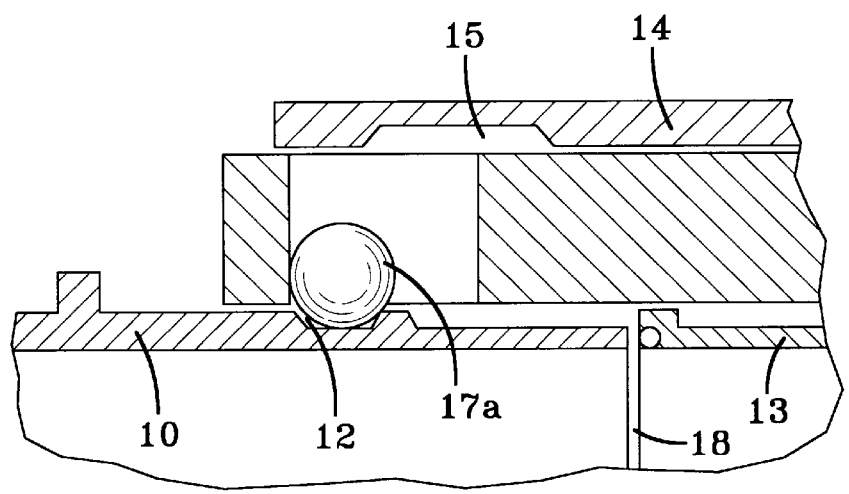
FIGS. 2 & 3 show the encircled area of FIG. 1, at increased material thickness and different sizes of the locking ball.
Figure 3:
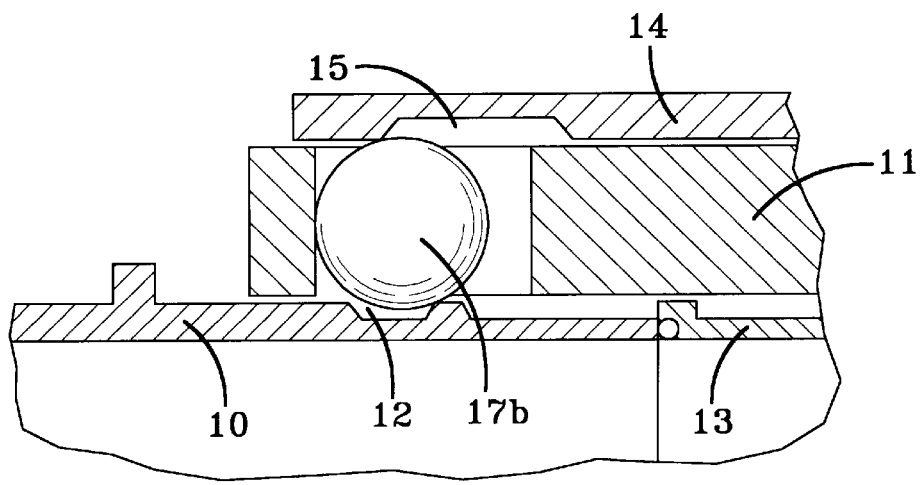

In certain cases a round ball is less suited as a locking body. FIG. 2 and 3 and 6, 7 show different embodiments of the encircled area of FIG. 1. At high pressure it will be desirable to increase the material thickness in the female part. FIG. 2 shows how a ball 17a adapted to the groove 15 in such a case will not be retained in a pressed in position by the sleeve 14. FIG. 3 shows that a ball 17b adapted to the increased material thickness will not have a satisfactory grip in the groove 12.

FIG. 4 shows in enlarged scale a locking body 117 according to the invention. This is angular with an outer elongated portion 20 and an inwardly directed portion 21 with a male part and a lateral, edge-shaped lip 22. The body is insertable in an elongated, axially directed groove 23 in the female part. In the end of the groove facing the opening of the female part is provided an oblong through-hole 24. Grooves 23 and 24 are so dimensioned that the locking body will have a certain mobility in the axial direction. The across dimension of the hole is somewhat smaller than the width of the groove, thus that the locking body will be supported and prevented from tilting down into the hole.

FIG. 6 shows a modified view corresponding to that in FIGS. 2 and 3, but with a male part 10 in a somewhat modified embodiment. The figure illustrates the position where the balancing pawl 16 is released and the locking body momentarily holds the male part for blowing off the over pressure. The edge-shaped lip 22 has a safe grip in the groove 12, but occupies so small space therein that the blowing off slot 118 can be substantially increased. The sleeve 14 in this position holds the locking body 117 pressed down, and a substantial part of the portion 23 is surrounded by the sleeve.

FIG. 7 shows the position, wherein the temporarily retracted sleeve has been let forward, whereby the groove 15 therein will be situated straight outside the locking body 117. At continued pulling of the male part outwards, the lip 22 slides up the edge of the groove 15. The entire locking body 117 is lifted outwards in the groove 15 and the male part will become completely free. In a position of rest the sleeve 14 covers the groove 23 and the hole 24 and prevents dirt from entering therein.

The embodiment shown in FIGS. 4–7 is only an example of the invention, the details of which can be modified in different manners within the scope for the following claims. Every coupling has several, preferably two locking bodies. Positioning and design of the lip shall be adapted to size and positioning of the groove in the male part with which it shall cooperate.

The invention has been described in detail with particular emphasis on the preferred embodiments, but variations and modifications within the spirit and scope of the invention may occur to those skilled in the art to which the invention pertains.

I claim:

1. A hose coupling consisting of a male part and a female part, where the female part is provided with a nonreturn valve which is actuatable at insertion of the male part, and which controls the flow through the coupling, and which is surrounded by an axially displaceable sleeve, which in a specific position of displacement retains at least one locking pawl in engagement with a groove in the male part, and in another position of displacement releases the locking pawl and urges at least one other locking body to engagement with the groove in a partly pulled out male part, wherein the locking body is angular and includes a portion, which is insertable in an axial groove in the female part and has a length, such that the locking body is always at least partially surrounded by the sleeve, and a second, inwardly directed portion, which has a length, such that the second, inwardly directed portion extends into the groove in the male part when the locking body is influenced by the sleeve.

2. A hose coupling according to claim 1, wherein the second portion of the locking body ends with a lateral edge-shaped lip.

* * * * *